United States Patent
Sato et al.

[11] Patent Number: 5,383,062
[45] Date of Patent: Jan. 17, 1995

[54] CFRP-MADE OPTICAL CYLINDER

[75] Inventors: Kunihiko Sato; Kazuo Morohashi; Hidetoshi Takahashi, all of Yokohama, Japan

[73] Assignee: Nippon Oil Co., Ltd., Tokyo, Japan

[21] Appl. No.: 136,933

[22] Filed: Oct. 18, 1993

[51] Int. Cl.⁶ .............................................. G02B 5/00
[52] U.S. Cl. ..................... 359/894; 156/184; 156/187; 138/125; 138/177; 419/24
[58] Field of Search ............... 359/894, 399; 52/309.1; 156/184, 187, 171; 138/125, 132, 177; 419/24

[56] References Cited
U.S. PATENT DOCUMENTS

| | | | |
|---|---|---|---|
| 4,601,928 | 7/1986 | Van Der Velden | 138/125 |
| 4,702,885 | 10/1987 | Odani et al. | 419/23 |
| 4,707,206 | 11/1987 | Trepus et al. | 138/125 |
| 4,950,064 | 8/1990 | Akin | 359/894 |
| 5,038,834 | 8/1991 | Siegfried | 138/177 |
| 5,052,444 | 10/1991 | Messerly | 138/132 |
| 5,191,486 | 3/1993 | Sato et al. | 359/894 |

*Primary Examiner*—Loha Ben
*Assistant Examiner*—Suma N. Ramaswamy
*Attorney, Agent, or Firm*—Cushman, Darby & Cushman

[57] ABSTRACT

The present invention provides a CFRP-made optical cylinder comprising, as the main CFRP layers, (a) CFRP layers containing a carbon fiber arranged in a direction substantially parallel to the cylinder axial direction and (b) CFRP layers containing a carbon fiber arranged in a direction making an angle of substantially $\pm(40\sim50)$ degree to the cylinder axial direction, in which cylinder at least 50% by weight of the carbon fiber arranged in a direction substantially parallel to the cylinder axial direction has a linear expansion coefficient of $-1\times10^{-6}/°C$. or less and at least 50% by weight of the carbon fiber arranged in a direction making an angle of substantially $\pm(40\sim50)$ degree to the cylinder axial direction has a linear expansion coefficient of $-1\times10^{-6}/°C$. or less, and which cylinder has a linear expansion coefficient of $-0.5\times10^{-6}/°C$. to $0.5\times10^{-6}/°C$. in the axial direction. In the present optical cylinder, the influence by the change in atmospheric temperature is very small. Further, in the production of the present optical cylinder, it has no distortion when subjected to heating and subsequent cooling to room temperature for molding, because it is well balanced in rigidity and strength.

15 Claims, 1 Drawing Sheet

CFRP-MADE OPTICAL CYLINDER

BACKGROUND OF THE INVENTION a) Field of the Invention

The present invention relates to a CFRP (carbon fiber-reinforced plastic)-made optical cylinder, particularly a CFRP-made optical cylinder used typically in astronomical telescopes, etc., more particularly a CFRP-made optical cylinder having a complicated shape used for special applications.

b) Description of the Related Art

Cylindrical articles used in industries and various devices or apparatuses are produced generally using various metallic materials or organic materials (e.g. resins). The requirements for these cylindrical articles depend upon their applications, and are extremely high in some cases. With respect to the optical cylinder intended by the present invention, no fully satisfactory material has been found because of the requirements.

In optical cylinders, for example, cylinders of astronomical telescopes, since the astronomical observation often lasts as long as several hours even when an ordinary type telescope is used, the deviation of an image from the focal length set in advance, due to the change in atmospheric temperature during the observation is as large as about 0.1 mm in the case of an iron-made cylinder of 1 m in length when the atmospheric temperature changes by 10° C. Thus when the telescope cylinder is made of iron having a thermal expansion coefficient $\alpha$ of $10 \times 10^{-6}/°C$. the deviation is as mentioned above, and when the telescope cylinder is made of aluminum having an $\alpha$ of $24 \times 10^{-6}/°C$., the deviation is as large as 0.24 mm.

The change in atmospheric temperature during the observation gives rise to air layers of different specific gravities in the cylinder when the cylinder is made of a metal material of high thermal conductivity, which produces a convection therein and consequently gives a distorted image. Incidentally the thermal conductivity of iron is 50 w/mk and that of aluminum is 237 w/mk. The formation of air layers of different specific gravities is influenced not only by the thermal conductivity of the cylinder material but also by its specific heat. Incidentally, the specific heat of iron is $3.6 \text{ J/cm}^3 \cdot °C$.

In the cylinders made of materials having the above-mentioned levels of the thermal expansion coefficient, thermal conductivity, specific heat, etc., the frequent focussing is required, making it difficult to maintain a sharp image during the observation time.

Japanese Patent Application Kokai (Laid-Open) No. 303627/1992 discloses a CFRP-made optical cylinder for general purpose. Such a CFRP-made optical cylinder gives a small change in elongation and shrinkage in the lengthwise (axial) direction when subjected to atmospheric temperature change and is satisfactory as an optical cylinder for general purpose.

The conventional CFRP-made optical cylinder such as mentioned above, however, has had inconveniences when produced in a complicated shape (e.g. a shape having only a single symmetrical plane) in order to permit its use in high requirement purposes, because the cylinder has a distortion caused by thermal curing and subsequent cooling during molding. Further, the conventional CFRP-made optical cylinder, when subjected to high strains of various modes, has shown insufficient rigidity and strength to torsional deformation and, as a result, has given rise to strain (e.g. permanent strain) and has been broken in some cases.

OBJECT AND SUMMARY OF THE INVENTION

In view of the above-mentioned situation of the prior art, the present inventors made research with a view to developing an optical cylinder which is not affected by the change in atmospheric temperature, which requires no frequent focussing, which always gives a sharp image, and which is lightweight and has high rigidity and strength.

As a result, the present inventors found that by using carbon fiber(s) having particular linear expansion coefficients in particular direction(s), an optical cylinder having a controlled linear expansion coefficient in the axial direction can be obtained and that the optical cylinder can maintain excellent properties even when produced in a complicated shape, whereby the above object can be achieved. The finding has led to the completion of the present invention.

The present invention relates to a CFRP-made optical cylinder comprising, as the main CFRP layers, (a) CFRP layers containing a carbon fiber arranged in a direction substantially parallel to the cylinder axial direction and (b) CFRP layers containing a carbon fiber arranged in a direction making an angle of substantially $\pm(40 \sim 50)$ degree to the cylinder axial direction, in which cylinder at least 50% by weight of the carbon fiber arranged in a direction substantially parallel to the cylinder axial direction has a linear expansion coefficient of $-1 \times 10^{-6}/°C$. or less and at least 50% by weight of the carbon fiber arranged in a direction making an angle of substantially $\pm(40 \sim 50)$ degree to the cylinder axial direction has a linear expansion coefficient of $-1 \times 10^{-6}/°C$. or less, and which cylinder has a linear expansion coefficient of $-0.5 \times 10^{-6}/°C$. to $0.5 \times 10^{-6}/°C$. in the axial direction.

In the CFRP-made optical cylinder of the present invention, a sharp image can be maintained without making the correction of the optical axis even when the atmospheric temperature changes largely. Further in the optical cylinder, since the thermal conductivity can be made as small as one several thousandsth of the case using iron or aluminum, there appear no air layers of different specific gravities and consequently no convection is generated, enabling the maintenance of a sharp image. Furthermore, the present optical cylinder, using a material having a larger specific modulus than conventional metallic materials, can allow the entire apparatus to have a significantly reduced weight. Moreover, in the production of the present CFRP-made optical cylinder, the cylinder before heat treatment gives no distortion when heated and then cooled to room temperature for molding, because it is well balanced in rigidity and strength.

Figure 1:
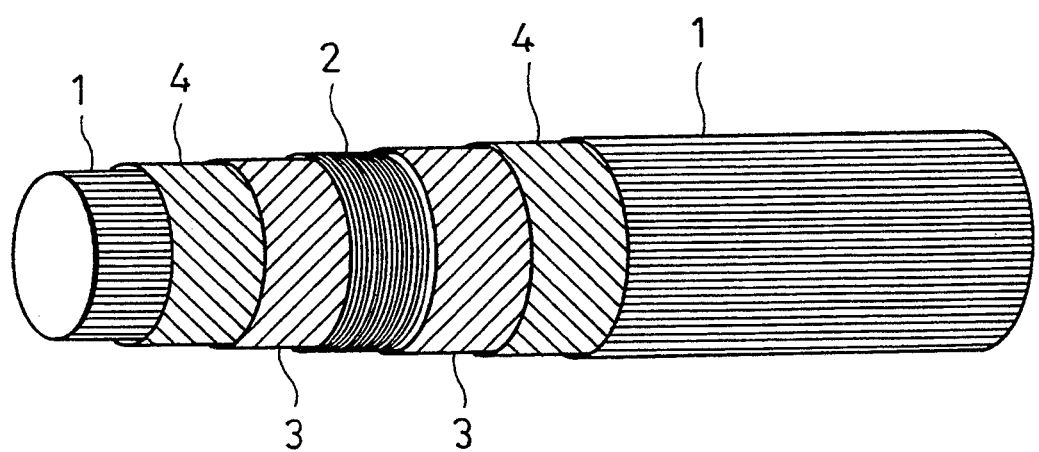
FIG. 1 shows the layer structure of a CFRP-made optical cylinder produced in Example 1 which is an example of the present CFRP-made optical cylinder comprising laminated CFRP layers.

In these FIGS., 1 indicates a CFRP layer whose carbon fiber is arranged in a direction substantially parallel to the cylinder axial direction; 2 indicates a CFRP layer whose carbon fiber is arranged in a direction substantially orthogonal to the cylinder axial direction; 3 indicates a CFRP layer whose carbon fiber is arranged in a direction making an angle of +(40~50) degree to the cylinder axial direction; 4 indicates a CFRP layer whose carbon fiber is arranged in a direction making an angle of −(40~50) degree to the cylinder axial direction; and 5 indicates a CFRP layer whose carbon fiber is arranged in a direction making an angle of ±(40~50) degree to the cylinder axial direction.

DETAILED DESCRIPTION OF THE INVENTION

Carbon fibers are generally obtained by using, as the material fiber, an organic fiber [e.g. a synthetic acrylic fiber (PAN) or a cellulose fiber], a pitch fiber (obtained by melt-spinning a petroleum pitch or a carbon pitch) or the like and subjecting the material fiber to an infusibilization treatment in an oxidizing atmosphere (e.g. air) ordinarily at 200°–400° C. to obtain an infusibilized fiber and heating the infusibilized fiber in an inert atmosphere at 800°–3,000° C.

These carbon fibers have fiber diameters of generally 15 μm or less, preferably 7–13 μm, and can be used in the form of strand generally consisting of, for example, 2,000–3,000 fibers.

In the present invention, at least 50% by weight, preferably at least 60% by weight of the carbon fiber arranged in a direction substantially parallel to the cylinder axial direction must have a linear expansion coefficient of $-1 \times 10^{-6}$/°C. or less, preferably $-1 \times 10^{-6}$/°C. to $-2 \times 10^{-6}$/°C., more preferably $-1.2 \times 10^{-6}$/°C. to $-1.6 \times 10^{-6}$/°C.

Such a carbon fiber is not particularly restricted but is particularly preferably a pitch-based carbon fiber. The carbon fiber has no particular restriction with respect to other properties but, in order for the resulting optical cylinder to have improved torsional rigidity and torsional strength, preferably has a tensile modulus of $24 \times 10^3$ kgf/mm$^2$ or more (about 235 GPa or more by SI unit system), preferably $30 \times 10^3$ kgf/mm$^2$ or more (about 294 GPa or more) and a tensile strength of 300 kgf/mm$^2$ or more (about 2,940 MPa or more by SI unit system), preferably 350 kgf/mm$^2$ or more (about 3,430 MPa or more).

At least 50% by weight, preferably at least 60% by weight of the carbon fiber arranged in a direction making an angle of ±(40~50) degree to the cylinder axial direction must have a linear expansion coefficient of $-1 \times 10^{-6}$/°C. or less, preferably $-1.2 \times 10^{-6}$/°C. or less. Such a carbon fiber is not particularly restricted but may be the same carbon fiber as mentioned above.

The carbon fibers used in the CFRP layers (a) and the CFRP layers (b) may be the same or, if necessary, different.

The resin used in the CFRP layers of the present optical cylinder can be a thermosetting resin selected from an epoxy resin, a phenolic resin, a urethane resin, an unsaturated polyester resin, a polycyanate resin, a melamine resin, etc. An epoxy resin is preferable when the present optical fiber is used in ordinary conditions, and a polycyanate resin is preferable when the optical cylinder is used in severe conditions.

The CFRP-made optical cylinder of the present invention can be produced by impregnating the above-mentioned carbon fiber with the above-mentioned thermosetting resin in a proportion suited for the object of the present invention, shaping the impregnated fiber into a cylindrical form, and curing the cylindrical form.

The CFRP-made optical cylinder of the present invention can be produced by various methods. The methods are specifically a method using prepregs, a method by filament winding, a method which is an appropriate combination thereof, etc.

The method using prepregs is generally conducted by impregnating a carbon fiber bundle with a thermosetting resin composition (e.g. an epoxy resin composition) to prepare a prepreg, cutting the prepreg in an appropriate direction, winding the cut prepreg around a cylindrical mold in a plurality of layers so that the carbon fiber in each layer is aligned in an intended direction, as necessary applying a shrink tape thereon, and heating the prepreg laminate under applied pressure.

The method by filament winding is generally conducted by impregnating a carbon fiber bundle with a thermosetting resin composition (e.g. an unsaturated polyester resin composition) to prepare a strand, winding the strand around a mandrel at an intended angle in a plurality of layers to prepare a cylinder of given thickness on the mandrel, and heat-curing the cylinder.

The method using prepregs has no particular restriction. However, in order to control the strain caused by curing shrinkage or heating shrinkage, it is desirable to laminate prepregs so that the fiber direction, etc. becomes symmetrical in the thickness direction of the laminate.

There may also be used a method in which a carbon fiber cloth is laminated in a plurality of layers and the laminate is impregnated with a resin, or a method in which a prepreg containing a carbon fiber cloth is laminated in a plurality of layers.

When the optical cylinder is produced in the method using prepregs containing a carbon fiber but containing no carbon fiber cloth, or the method by filament winding or the method which is an appropriate combination thereof and the produced cylinder is subjected to machine works such as hole making, polishing and the like, it is preferable that the prepreg laminate or the strand laminate both of cylindrical form contain at least one layer of a carbon fiber cloth or at Least one layer of a carbon fiber cloth-containing prepreg, because this can prevent fluffing, burr formation, etc. in the machine works of the produced cylinder and makes easy the machine works. Use of a carbon fiber cloth-containing prepreg is particularly preferable.

The proportion (volume ratio) of the carbon fiber and the thermosetting resin is 75:25 to 50:50, preferably 60:40 to 50:50. Preferably, the carbon fiber is nearly in the closest packing, but its maximum proportion is 75–70%.

The prepregs used in the present invention each have a thickness of generally 0.05–0.3 mm, preferably 0.1–0.2 mm.

The prepregs are laminated in an appropriate thickness in order to satisfy the strength required by the cylinder to be produced. For example, a film having a thickness of 0.12 mm can be laminated in 10–20 layers to obtain a laminate having a thickness of 1.2–2.4 mm.

In producing the CFRP-made optical cylinder of the present invention, in order to alleviate the thermal strain and curing strain generated during the molding, it is important that the CFRP layer(s) containing a carbon fiber arranged in a direction making an angle of substantially +(40~50) degree to the cylinder axial direction and the CFRP layer(s) containing a carbon fiber arranged in a direction making an angle of substantially −(40∼50) degree to the cylinder axial direction be laminated so as to generally have a volume ratio of substantially 50:50.

Meanwhile, the CFRP layers containing a carbon fiber arranged in a direction substantially parallel to the cylinder axial direction and the CFRP layers containing a carbon fiber arranged in a direction making an angle of ±(40∼50) degree to the cylinder axial direction have a volume ratio of generally 80:20 to 30:70, preferably 70:30 to 40:60, more preferably 60:40 to 45:55.

The present CFRP-made optical cylinder may comprise, in addition to the above-mentioned CFRP layers, CFRP layer(s) containing a carbon fiber arranged in a direction substantially orthogonal to the cylinder axial direction. In this case, the CFRP layers containing a carbon fiber arranged in a direction substantially parallel to the cylinder axial direction and the CFRP layer(s) containing a carbon fiber arranged in a direction substantially orthogonal to the cylinder axial direction have a volume ratio of generally 40:60 to 70:30, preferably about 45:55 to about 60:35. Overall, (1) the total of the CFRP layers containing a carbon fiber arranged in a direction substantially parallel to the cylinder axial direction and the CFRP layer(s) containing a carbon fiber arranged in a direction substantially orthogonal to the cylinder axial direction and (2) the CFRP layers containing a carbon fiber arranged in a direction making an angle of ±(40∼50) degree to the cylinder axial direction, have a volume ratio of generally 80:20 to 30:70, preferably 70:30 to 40:60, more preferably 60:40 to 45:55.

According to the finding by the present inventors, it is desirable that the strength and rigidity of molded composites be well balanced in any direction on the plane in order to give a CFRP-made optical cylinder which in the practical application, has sufficient strength and rigidity and yet small thermal expansion coefficient and which gives no distortion even when it has a complicated shape. When those properties are poorly balanced, the cylinder may have distortion partially or wholly when returned to room temperature after thermal molding.

In order to obtain an optical cylinder well balanced in said properties, it is desirable to use different CFRP layers containing carbon fibers arranged in different directions, in the above-mentioned volume ratio.

As long as the present cylinder has a linear expansion coefficient of the range specified by the present invention, in the axial direction, the cylinder may further comprise CFRP layer(s) containing a carbon fiber(s) arranged in direction(s) different from the directions substantially parallel to, or making an angle of ±(40∼50) degree to, or substantially orthogonal to the cylinder axial direction.

The CFRP-made optical cylinder of the present invention is also characterized by having a thermal conductivity of 0.1 w/m·k or less in the cylinder thickness direction. That is, the present optical cylinder has a thermal conductivity in the thickness direction which is one several thousandsth of that of iron or aluminum (conventional material); accordingly, there appear no air layers of different specific gravities in the cylinder and no convection is generated, and consequently a sharp image can be maintained.

EXAMPLES 1-2

A roving consisting of 5 rovings of 2000 pitch-based carbon fibers (diameter: 10 μm, tensile modulus: 500 GPa, tensile strength: 4,000 MPa, tensile elongation: 0.3%, linear expansion coefficient: $-0.9 \times 10^{-6}/°C$ to $-1.2 \times 10^{-6}/°C$, volume resistivity: $0.5 \times 10^{-3} \Omega \cdot cm$ to $0.8 \times 10^{-3} \Omega \cdot cm$) was impregnated, under tension, with an epoxy resin [Epicoat 828 (trade name) manufactured by Yuka Shell Epoxy K.K.]at a volume ratio of 60 (carbon fiber) : 40 (epoxy resin), to produce a carbon fiber-containing resin film of 120 μm in thickness in which the carbon fibers were arranged in the same direction.

Separately, the same carbon fiber bundle (consisting of 2,000 pitch-based carbon fibers) as used above was made into a carbon fiber plain cloth. The cloth was impregnated with the same epoxy resin as used above, to produce a carbon fiber cloth-containing resin film of 120 μm in thickness having a carbon fiber/epoxy resin volume ratio of 50:50.

Then, the carbon fiber-containing resin film was wound around an aluminum-made cylindrical mandrel in a plurality of layers so that the carbon fiber in each layer was arranged in a direction shogun in FIG. 1, relative to the cylinder axial direction. Thereafter, a shrink tape was wound thereon. The resulting laminate was heated under pressure for curing.

In Table 1 was shown the volume ratio of the three kinds of CFRP layers formed in the above laminate, i.e. (1) the CFRP layers containing a carbon fiber arranged in a direction substantially parallel to the cylinder axial direction, (2) the CFRP layer containing a carbon fiber arranged in a direction orthogonal to the cylinder axial direction and (3) the CFRP layers containing a carbon fiber arranged in a direction making an angle of substantially ±(40∼50) degree to the cylinder axial direction.

The thus produced cylinder had an outside diameter of 324.0 mm and an inside diameter of 320.8 mm. This was used as a cylinder of an astronomical telescope having a total length of 820 mm, a length between fulcrums of 300 mm and an effective length of 520 mm.

The cylinder was measured for moduli in axial direction and circumferential direction, torsional modulus when twisted about the axis, thermal expansion coefficient and thermal deformation both in axial direction, and thermal conductivity in thickness direction. The results are shown in Table 1 as the typical mechanical and thermal properties of the CFRP-made optical cylinder of the present invention.

Figure 2:
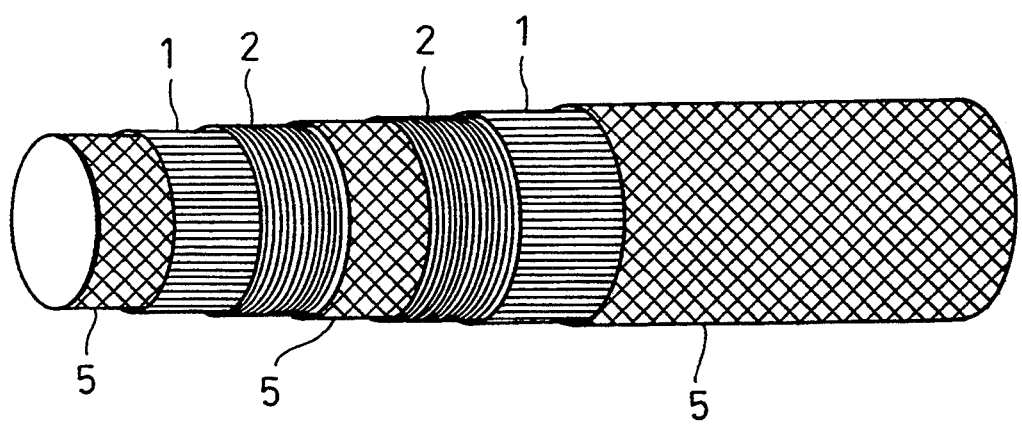
FIG. 2 shows the layer structure of a CFRP-made optical cylinder produced in Example 2, which is another example of the present CFRP-made optical cylinder.

Using the same carbon fiber-containing resin film and carbon fiber cloth-containing resin film as used above, an optical cylinder of Example 2 having a laminate structure shown in FIG. 2 was produced in the same manner as above. The cylinder was measured for the same property items. The results are shown in Table 1.

Comparative Example 1

Using the same carbon fiber-containing resin film as used in Examples, an optical cylinder was produced in the same manner as in Examples with the exception that in the layer lamination, the voluble ratio of the CFRP layers (1), (2) and (3) was 60:40:0. The results are shown in Table 1.

Comparative Examples 2-3

Two optical cylinders each having the same dimension as shown above were produced using, as the material, iron or aluminum in place of the carbon fiber-containing resin film. They were measured for the same property items. The results are shown in Table 1.

In the above property measurements, thermal deformation was expressed by the elongation or shrinkage (mm) in cylinder axial direction when a cylinder was subjected to temperature elevation of 5° C.

TABLE 1

|  | Example | | Comparative Example | | |
|---|---|---|---|---|---|
|  | 1 | 2 | 1 | 2 | 3 |
| Material | CFRP | CFRP | CFRP | Iron | Aluminum |
| Volume ratio*1 | 32/23/45 | 30/30/40 | 60/40/0 | — | — |
| Weight (kg) | 2.90 | 2.87 | 2.90 | 10.4 | 4.48 |
| Bending modulus in cylinder axial direction (GPa) | 100.9 | 93.3 | 109.0 | 205.8 | 68.6 |
| Bending modulus in cylinder curcumferential direction (GPa) | 74.8 | 93.3 | 140.0 | 205.8 | 68.6 |
| Torsional modulus (GPa) | 46.6 | 28.7 | 8.33 | 79.4 | 25.8 |
| Thermal deformation (mm/°C.) | −0.00043 | 0.00039 | 0.00021 | 0.041 | 0.098 |
| Linear expansion coefficient in cylinder axial direction (× $10^{-6}$/°C.) | −0.11 | 0.10 | −0.05 | 10 | 24 |
| Thermal conductivity in cylinder thickness direction (W/m · k) | 0.0143 | 0.0143 | 0.0143 | 50 | 237 |

*1Volume ratio of the CFRP layers containing a carbon fiber arranged in a direction substantially parallel to the cylinder axial direction/the CFRP layers containing a carbon fiber arranged in a direction orthogonal to the cyliner axial direction/the CFRP layers containing a carbon fiber arranged in a direction making an angle of ±(40~50) degree to the cylinder axial direction.

What is claimed is:

1. A CFRP-made optical cylinder comprising, as the main CFRP layers, (a) CFRP layers containing a carbon fiber arranged in a direction substantially parallel to the cylinder axial direction and (b) CFRP layers containing a carbon fiber arranged in a direction making an angle of substantially±(40-50) degree to the cylinder axial direction, in which cylinder at least 50% by weight of the carbon fiber arranged in a direction substantially parallel to the cylinder axial direction has a linear expansion coefficient of $-1\times10^{-6}$/°C. or less and at least 50% by weight of the carbon fiber arranged in a direction making an angle of substantially±(40~50) degree to the cylinder axial direction has a linear expansion coefficient of $-1\times10^{-6}$/°C. or less, and which cylinder has a linear expansion coefficient of $-0.5\times10^{-6}$/°C. to $0.5\times10^{-6}$/°C. in the axial direction.

2. The CFRP-made optical cylinder of claim 1, which has a thermal conductivity of 0.'w/m·k or less in the thickness direction.

3. The CFRP-made optical cylinder of claim 1, wherein the volume ratio of the CFRP layers (a) and the CFRP layers (b) is in the range of 80:20 to 30:70.

4. The CFRP-made optical cylinder of claim 1, which further comprises (c) CFRP layer(s) containing a carbon fiber arranged in a direction substantially orthogonal to the cylinder axial direction and wherein the volume ratio of the CFRP layers (a) and the CFRP layer(s) (c) is in the range of 40:60 to 70:30.

5. The CFRP-made optical cylinder of claim 1, which further comprises (c) CFRP layer(s) containing a carbon fiber arranged in a direction substantially orthogonal to the cylinder axial direction and wherein the volume ratio of the CFRP layers (a) and (c) and the CFRP layers (b) is in the range of 80:20 to 30:70.

6. The CFRP-made optical cylinder of claim 1, wherein each carbon fiber uses, as the raw material fiber, a pitch fiber obtained by melt-spinning a petroleum pitch or a carbon pitch.

7. The CFRP-made optical cylinder of claim 1, wherein each carbon fiber has a fiber diameter of 15 μm or less and is used in the form of a strand consisting of 2,000–3,000 fibers.

8. The CFRP-made Optical cylinder of claim 1, wherein the resin used in the CFRP's is a thermosetting resin selected from the group consisting of a phenolic resin, a urea resin, a melamine resin, an unsaturated polyester resin and an epoxy resin.

9. The CFRP-made optical cylinder of claim 1, which is produced by impregnating a carbon fiber with a thermosetting resin in a given proportion, shaping the impregnated carbon fiber into a cylindrical form, and curing the cylindrical form.

10. The CFRP-made optical cylinder of claim 9, wherein said production is conducted by a method using prepregs, a method by filament winding or a combination thereof.

11. The CFRP-made optical cylinder of claim 10, wherein the method by filament winding comprises impregnating a carbon fiber bundle with an epoxy resin composition to prepare a strand, winding the strand around a mandrel in a plurality of layers to prepare a cylinder of given thickness on the mandrel, and heat-curing the cylinder.

12. The CFRP-made optical cylinder of claim 10, wherein the method using prepregs comprises impregnating a carbon fiber bundle with an epoxy resin composition to prepare a prepreg, cutting the prepreg in an appropriate direction, winding the cut prepreg round a cylindrical mold in a plurality of layers, as necessary applying a tape thereon, and heating the prepreg Layers under applied pressure.

13. The CFRP-made optical cylinder of claim 10, wherein the prepregs each have a thickness of 0.05–0.3 mm.

14. The CFRP-made optical cylinder of claim 10, wherein the prepregs are laminated in a thickness of 1.2–2.4 mm.

15. The CFRP-made optical cylinder of claim 9, wherein the proportion (volume ratio) of the carbon fiber and the thermosetting resin is 75:25 to 50:50.

* * * * *